US008838557B2

(12) United States Patent
Bhogal et al.

(10) Patent No.: US 8,838,557 B2
(45) Date of Patent: Sep. 16, 2014

(54) AUTOMATED VIEWABLE SELECTABLE CHANGE HISTORY MANIPULATION

(75) Inventors: Kulvir S. Bhogal, Pflugerville, TX (US); Lisa Seacat DeLuca, San Francisco, CA (US); Travis M. Grigsby, Austin, TX (US); Frank L. Jania, Chapel Hill, NC (US)

(73) Assignee: International Business Machines Corporation, Armonk, NY (US)

( * ) Notice: Subject to any disclaimer, the term of this patent is extended or adjusted under 35 U.S.C. 154(b) by 733 days.

(21) Appl. No.: 12/498,706

(22) Filed: Jul. 7, 2009

(65) Prior Publication Data

US 2011/0010350 A1    Jan. 13, 2011

(51) Int. Cl.
*G06F 17/30* (2006.01)
(52) U.S. Cl.
CPC .............................. *G06F 17/30067* (2013.01)
USPC ........................................................ 707/695
(58) Field of Classification Search
USPC .................................... 707/999.203; 715/235
See application file for complete search history.

(56) References Cited

U.S. PATENT DOCUMENTS

| | | | | |
|---|---|---|---|---|
| 5,574,846 A | * | 11/1996 | Yoshimura et al. | 345/418 |
| 6,044,385 A | * | 3/2000 | Gross et al. | 715/205 |
| 6,527,812 B1 | * | 3/2003 | Bradstreet | 715/210 |
| 6,567,830 B1 | * | 5/2003 | Madduri | 715/235 |

OTHER PUBLICATIONS

Chii Meng, Motohiro Yasue, Atsumi Imamiya, Xiaoyang Mao, Visualizing Histories for Selective Undo and Redo, Article, 1998, pp. 1-6, Yamanashi University, Japan.

* cited by examiner

*Primary Examiner* — Rehana Perveen
*Assistant Examiner* — Hung Havan
(74) *Attorney, Agent, or Firm* — Lee Law, PLLC; Christopher B. Lee

(57) ABSTRACT

A set of edited changes associated with an editable file is displayed on a display associated with a computing device in response to receipt of a request via a user input device to display the plurality of edited changes. A contextual representation of the editable file is displayed. A context indicator is displayed within the contextual representation of the editable file that represents a location within the editable file associated with a first of the displayed set of edited changes. The context indicator is iteratively updated to represent a location within the editable file associated with each selected element of the displayed set of edited changes in response to detection of user selections of elements of the displayed set of edited changes received via the user input device.

25 Claims, 9 Drawing Sheets

AUTOMATED VIEWABLE SELECTABLE CHANGE HISTORY MANIPULATION

BACKGROUND

The present invention relates to change tracking within editable files. More particularly, the present invention relates to automated viewable selectable change history manipulation.

An editable file may be displayed within a file editor executed by a computing device. Changes to the editable file are placed within a list of changes, sometimes referred to as a change history. The list of changes represents a sequential list of changes to the editable file. A user may instruct the file editor to undo changes sequentially in a reverse order from the order in which the changes were made and added to the list of changes.

SUMMARY

A method includes displaying a plurality of edited changes associated with an editable file on a display associated with a computing device in response to receipt of a request via a user input device to display the plurality of edited changes; displaying a contextual representation of the editable file; displaying a context indicator within the contextual representation of the editable file that represents a location within the editable file associated with a first of the displayed plurality of edited changes; and iteratively updating, in response to detection of user selections of elements of the displayed plurality of edited changes received via the user input device, the context indicator to represent a location within the editable file associated with each selected element of the displayed plurality of edited changes.

A system includes a display; a user input device; and a processor programmed to: display a plurality of edited changes associated with an editable file on the display in response to receipt of a request via the user input device to display the plurality of edited changes; display a contextual representation of the editable file; display a context indicator within the contextual representation of the editable file that represents a location within the editable file associated with a first of the displayed plurality of edited changes; and iteratively update, in response to detection of user selections of elements of the displayed plurality of edited changes received via the user input device, the context indicator to represent a location within the editable file associated with each selected element of the displayed plurality of edited changes.

An alternative system includes a display; a user input device; and a processor programmed to: display a plurality of edited changes associated with an editable file on the display in response to receipt of a request via the user input device to display the plurality of edited changes; display a contextual representation of the editable file; display a context indicator within the contextual representation of the editable file that represents a location within the editable file associated with a first of the displayed plurality of edited changes; iteratively update, in response to detection of user selections of elements of the displayed plurality of edited changes received via the user input device, the context indicator to represent a location within the editable file associated with each selected element of the displayed plurality of edited changes; determine a logical relationship between a sequence of changes to the editable file; maintain the sequence of changes with the determined logical relationship as one logical element of the plurality of edited changes; receive a request to undo the sequence of changes with the determined logical relationship maintained as the one logical element; and revert the sequence of changes with the determined logical relationship.

A computer program product includes a computer readable storage medium including a computer readable program, where the computer readable program when executed on a computer causes the computer to: display a plurality of edited changes associated with an editable file on a display in response to receipt of a request via a user input device to display the plurality of edited changes; display a contextual representation of the editable file; display a context indicator within the contextual representation of the editable file that represents a location within the editable file associated with a first of the displayed plurality of edited changes; and iteratively update, in response to detection of user selections of elements of the displayed plurality of edited changes received via the user input device, the context indicator to represent a location within the editable file associated with each selected element of the displayed plurality of edited changes.

DETAILED DESCRIPTION

Figure 1:
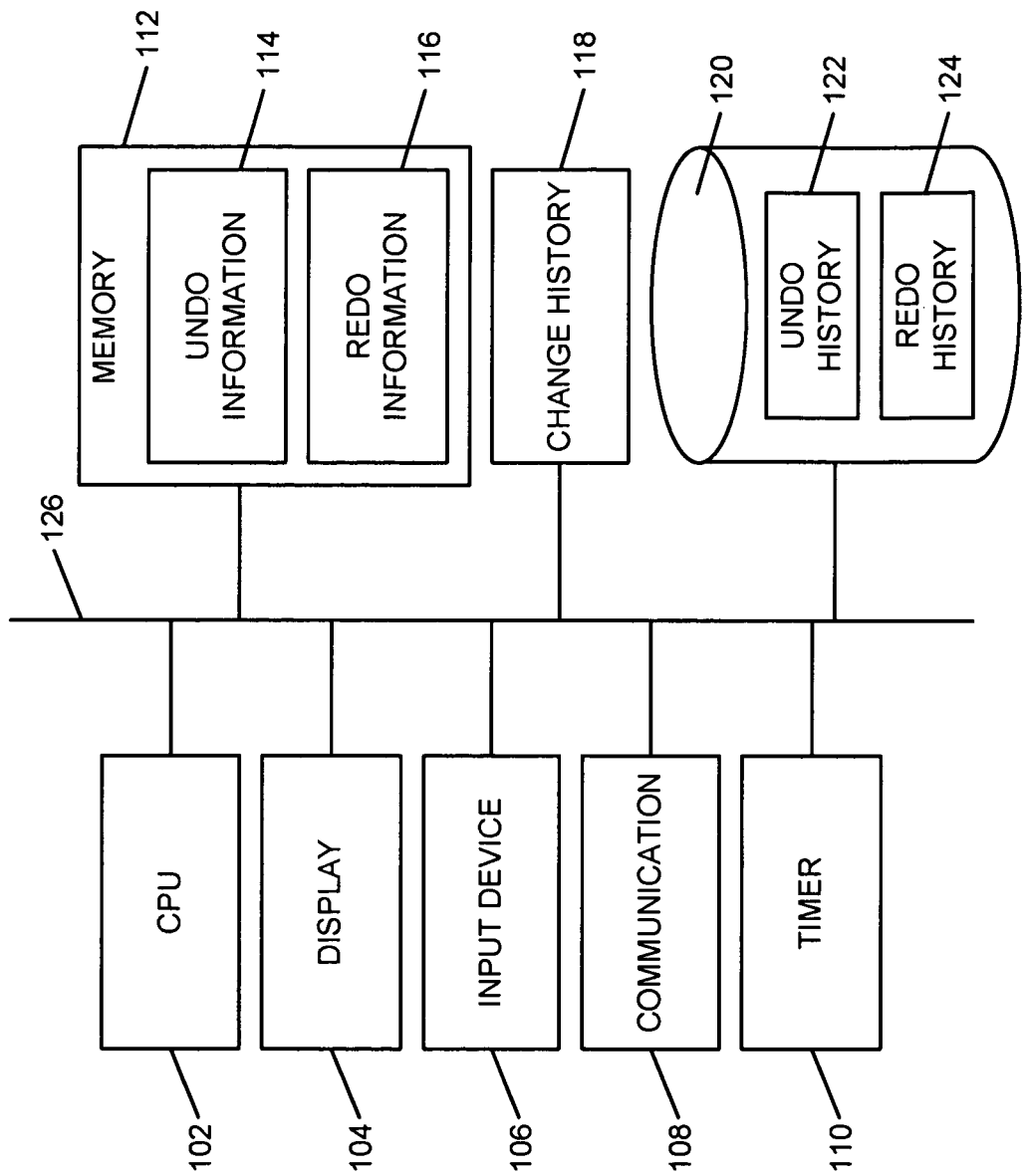
FIG. 1 is a block diagram of an example of an implementation of a computing device for automated viewable selectable change history manipulation according to an embodiment of the present subject matter.

The examples set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The subject matter described herein provides automated viewable selectable change history manipulation. A user is provided with both a visual representation of each edit (e.g., an undo history) to an editable file and a visual context for each edit within the file. A displayed visual stack representing a set of edits resembles a deck of cards either stacked on or spread over a surface. A contextual representation of the file is displayed beside the visual stack. A context indicator is displayed within the contextual representation to represent a location of each edit within the file. As the user iteratively reviews and selects elements of the visual stack via an input device, the context indicator is automatically updated for each selected edit within the contextual representation. A user may request via the input device to undo a selected edit and the selected edit is reverted. Reverted edits are stored within a redo history and may be visually reviewed and re-executed (e.g., re-entered into the file) similarly to the undo procedure described above. Thus, several visual and automated elements related to an editing event are made available in one display, allowing ease of manipulation of changes to files and providing timely, automated feedback to a user as changes are made and reviewed.

Logical relationships may be established between sequences of edits to the editable file. The logical relationships may be based upon time (e.g., edits during a portion of a day, an entire day, etc.). Change history is built as each edit in the sequence of edits is made. Additionally, dependencies between sequences of edits, such as sequences of edits directed to the same editable element of a file may be identified. Determined logical relationships may be assigned to the sequence of changes and maintained as individual elements of the undo/redo history. As such, a request to revert a change may be associated with a logically-related sequence of changes to the file or an editable element within a file, and all changes assigned to the logical relationship may be reverted together. For example, where numerous logically-related edits are made to large and/or complex files, such as large documents or images, ease of tracking of these numerous edits, as well as the opportunity to automatically revert several related edits via a single request, may be expedited.

The visual stack may be compressed, either in its entirety, or on one or both ends, upon a determination that more changes are stored within the undo/redo history than may be displayed within an available display area for display of the visual stack. The number of elements within the undo/redo history, and the number of compressed and uncompressed edits may be configured by a user via an input device.

The contextual representation of the file may be configured to be proportional to a size of a selected edit relative to a size of the editable file. As such, the contextual representation of the file may be a proportional contextual representation. The proportional determination may be performed upon the initial display of the visual stack or upon selection of each element of the visual stack.

The context indicator may include a highlighted section of the contextual representation, such as a dashed box, a highlighting of a region, or other suitable indication approach at the location representative of the selected edit. Additionally, the context indicator may include toggling a displayed portion of the editable file within the contextual representation between a state prior to a selected edit and a state after the selected edit to further highlight the context for the selected edit. The toggling of the selected edit may alternatively be performed within a focused pane of the visual stack associated with the selected edit.

The user may select an edit within the visual stack and may request, via the input device, to filter the undo/redo history based upon edits associated with a selected edit. Edits that are not associated with the selected and filtered edit may be removed from the visual stack. As such, dependent edits and/or logically related edits may be presented without requiring the user to view all edits associated with an editable file to expedite processing, such as where numerous unique edits are made to large and/or complex files.

The viewable selectable change history manipulation described herein may be performed in real time to allow prompt manipulation of a visual change history with associated context. For purposes of the present description, real time shall include any time frame of sufficiently short duration as to provide reasonable response time for information processing acceptable to a user of the subject matter described. Additionally, the term "real time" shall include what is commonly termed "near real time"—generally meaning any time frame of sufficiently short duration as to provide reasonable response time for on-demand information processing acceptable to a user of the subject matter described (e.g., within a portion of a second or within a few seconds). These terms, while difficult to precisely define, are well understood by those skilled in the art.

Additionally, for purposes of the present subject matter, a "request" received, for example via a user input device, may be received in response to a detection of a user selection of a menu option or other user interface selection. A request may also have an associated action that is requested. The requested action may be automatically generated by a user interface component that is associated with the request selection or may be entered by a user via a user input device. Similarly, "selection" of an element may be detected, for example via a user input device, and actions may be performed in response to detection of such selections.

FIG. 1 is a block diagram of an example of an implementation of a computing device 100 for automated viewable selectable change history manipulation. Within the computing device 100, several example components are illustrated. As will be described in more detail below in association with FIG. 2 through FIG. 8B, the computing device 100 provides automated viewable selectable change history manipulation based upon a display of context in association with a visual stack with elements that represent changes to an editable file. The user may configure the viewable selectable change history manipulation via inputs to the computing device 100 to customize the performance of the computing device 100 in association with the viewable selectable change history manipulation.

It should be noted that the computing device 100 may be a portable computing device, either by a user's ability to move the computing device 100 to different locations or by the computing device 100's association with a portable platform, such as a plane, train, automobile, or other moving vehicle. It should also be noted that the computing device 100 may be any computing device capable of processing information as described above and in more detail below. For example, the computing device 100 may include devices such as a personal computer (e.g., desktop, laptop, palm, etc.) or a handheld device (e.g., cellular telephone, personal digital assistant (PDA), email device, music recording or playback device, etc.), or any other device capable of processing information as described in more detail below.

The computing device 100 may interface with external devices, such as via a network (not shown) or other interconnection, for access and retrieval of content and editable files. Such a network or other interconnection may include any form of interconnection suitable for the intended purpose, including a private or public network such as an intranet or the Internet, respectively, direct inter-module interconnection, dial-up, wireless, or any other interconnection mechanism capable of interconnecting the devices with a wide-area network. The viewable selectable change history manipulation described herein may be associated with any editable file accessible via the computing device 100.

Associated with the computing device 100 is a central processing unit (CPU) 102 that provides computer instruction execution, computation, and other capabilities within the computing device 100. A display 104 provides visual information to a user of the computing device 100 and an input device 106 provides input capabilities for the user.

The display 104 may include any display device, such as a cathode ray tube (CRT), liquid crystal display (LCD), light emitting diode (LED), projection, touchscreen, or other display element or panel. The input device 106 may include an input interface for a computer keyboard, a keypad, a mouse, a pen, a joystick, or any other type of input device by which the user may interact with and respond to information on the display 104. For purposes of the present description, the input device 106 shall be referred to generally in association with description of general user input to the computing device 100, and referred to as a keyboard or mouse when appropriate for a given portion of an example being described. However, it is understood that user inputs received and generated by these respective devices are processed by the input device 106 for further processing, as described in more detail below.

A communication module 108 provides interconnection capabilities that allow the computing device 100 to communicate with other modules, such as external servers, to retrieve content and editable files. The communication module 108 may include any electrical, protocol, and protocol conversion capabilities useable to provide the interconnection capabilities. Though the communication module 108 is illustrated as a component-level module for ease of illustration and description purposes, it should be noted that the communication module 108 may include any hardware, programmed processor(s), and memory used to carry out the functions of the communication module 108 as described above and in more detail below. For example, the communication module 108 may include additional controller circuitry in the form of application specific integrated circuits (ASICs), processors, antennas, and/or discrete integrated circuits and components for performing communication and electrical control activities associated with the communication module 108. Additionally, the communication module 108 may include interrupt-level, stack-level, and application-level modules as appropriate. Furthermore, the communication module 108 may include any memory components used for storage, execution, and data processing for performing processing activities associated with the communication module 108.

The communication module 108 may also form a portion of other circuitry described without departure from the scope of the present subject matter.

A timer 110 provides timing capabilities for the computing device 100. The timer 110 may include a general timing device used by the CPU 102 to derive timing relationships for events. Alternatively, the timer 110 may include a real-time clock (RTC) device capable of providing date, day, time, and other related time-based parameters. Using the timer 110, the computing device 100 may organize changes to an editable file based upon a time associated with each change. In such a situation, the computing device 100 may provide processing for viewing, filtering, reverting (e.g., undoing), or otherwise processing changes created during a certain time period. As such, the timing capabilities of the timer 110 provide the computing device 100 with a capability of performing such processing in associated with the automated viewable selectable change history manipulation.

A memory 112 includes an undo information storage area 114 that stores undo history information, such as configuration and other information, that may be used for displaying undo history information on the display 104 and used to configure a viewable selectable undo change history. As will be described in more detail below, the user may manipulate the displayed viewable selectable undo change history via the input device 106. The memory 112 also includes a redo information storage area 116 that stores redo history information, such as configuration and other information, that may be used for displaying redo history information on the display 104 and used to configure a viewable selectable redo change history (e.g., undo history information that has been reversed/undone). The user may also manipulate the displayed viewable selectable redo change history via the input device 106.

It is understood that the memory 112 may include any combination of volatile and non-volatile memory suitable for the intended purpose, distributed or localized as appropriate, and may include other memory segments not illustrated within the present example for ease of illustration purposes. For example, the memory 112 may include a code storage area, a code execution area, and a data area without departure from the scope of the present subject matter.

The computing device 100 also includes a change history processing module 118. The change history processing module 118 implements the viewable selectable change history manipulation for the computing device 100, as described in more detail below. Though the change history processing module 118 is illustrated as a component-level module for ease of illustration and description purposes, it should be noted that the change history processing module 118 may include any hardware, programmed processor(s), and memory used to carry out the functions of the module as described above and in more detail below. For example, the change history processing module 118 may include additional controller circuitry in the form of application specific integrated circuits (ASICs), processors, and/or discrete integrated circuits and components for performing communication and electrical control activities associated with the device. Additionally, the change history processing module 118 may also include interrupt-level, stack-level, and application-level modules as appropriate. Furthermore, the change history processing module 118 may include any memory components used for storage, execution, and data processing for performing processing activities associated with the module.

It should also be noted that the change history processing module 118 may form a portion of other circuitry described without departure from the scope of the present subject matter. Further, the change history processing module 118 may alternatively be implemented as applications stored within the memory 112. In such an implementation, the change history processing module 118 may include instructions executed by the CPU 102 for performing the functionality described herein. The CPU 102 may execute these instructions to provide the processing capabilities described above and in more detail below for the computing device 100. The change history processing module 118 may form a portion of an interrupt service routine (ISR), a portion of an operating system, a portion of a browser application, or a portion of a separate application without departure from the scope of the present subject matter.

A database 120 is associated with the computing device 100 and provides storage capabilities for information associated with the viewable selectable change history manipulation of the computing device 100. The database 120 includes an undo history storage area 122 and a redo history storage area 124 that may be stored in the form of tables or other arrangements accessible by the computing device 100. The undo history storage area 122 includes change information associated with editable files. The redo history storage area 124 also includes change information for changes that have been reversed in response to user inputs via the input device 106. The information stored within the undo history storage area 122 and the redo history storage area 124 may be configured and presented to the user via the display 104 as a viewable selectable change history. The user may interact with the displayed viewable selectable change history via the input device 106 to manipulate and request changes to be undone, or redone, respectively.

The CPU 102, the display 104, the input device 106, the communication module 108, the timer 110, the memory 112, the change history processing module 118, and the database 120 are interconnected via an interconnection 126. The interconnection 126 may include a system bus, a network, or any other interconnection capable of providing the respective components with suitable interconnection for the respective purpose.

While the computing device 100 is illustrated with and has certain components described, other modules and components may be associated with the computing device 100 without departure from the scope of the present subject matter. Additionally, it should be noted that, while the computing device 100 is described as a single device for ease of illustration purposes, the components within the computing device 100 may be co-located or distributed and interconnected via a network without departure from the scope of the present subject matter. For a distributed arrangement, the display 104 and the input device 106 may be located at a point of sale device, kiosk, or other location, while the CPU 102 and memory 112 may be located at a local or remote server. Many other possible arrangements for components of the computing device 100 are possible and all are considered within the scope of the present subject matter. It should also be understood that, though the undo storage history area 122 and the redo history storage area 124 are shown within the database 120, they may also be stored within the memory 112 without departure from the scope of the present subject matter. Accordingly, the computing device 100 may take many forms and may be associated with many platforms.

FIG. 2 through FIG. 5 provide an illustration of a sequence of an example of an implementation of a graphical user interface (GUI) 200 that may be displayed on the display 104 of the computing device 100 to provide viewable selectable change history manipulation for an editable file being edited within the GUI 200. As will be described in more detail below, the example GUI 200 provides a user of the computing device 100 with visual information usable in combination with inputs detected via the input device 106 to allow the computing device 100 to manipulate a change history for an editable file. As described above, the input device 106 shall be referenced generally within the following description to refer to user input operations. Additionally, a mouse or keyboard will also be referenced when suitable for a given portion of an example. It should be noted that as the user moves a mouse or makes certain input key presses associated with a keyboard, as detected by the input device 106, the computing device 100 adjusts the elements of the GUI 200 in response to those movements. The editable file may include a file, such as a text document, an image file, or any other editable file. It should be understood that certain sequences of operations associated with the example GUI 200 are described below without sequential illustration for ease of illustration purposes.

Figure 2:
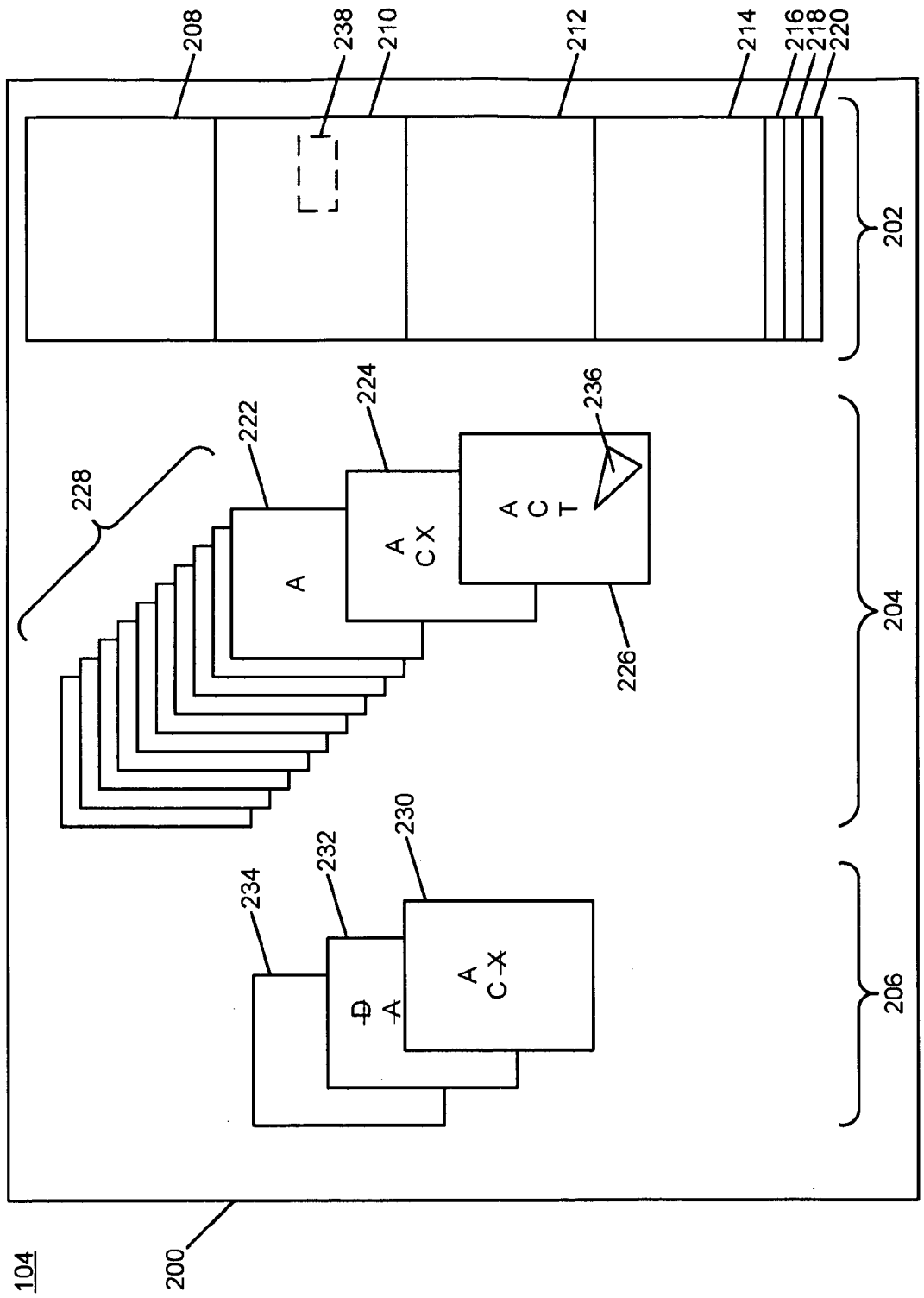
FIG. 2 is an illustration of an example of an implementation of a graphical user interface (GUI) that provides automated viewable selectable change history manipulation and that represents a state of operations for the GUI after detecting a user selection to show undo and/or redo history for the editable file according to an embodiment of the present subject matter.

FIG. 2 is an illustration of an example of an implementation of the GUI 200 that provides automated viewable selectable change history manipulation and that represents a state of operations for the GUI 200 after detecting a user selection to show undo and/or redo history for the editable file. For example, detection of a user selection may include detecting an operation, such as a key selection on a keyboard or a selection associated with a pop-up menu for editing preferences, or any other suitable form of selection, to show undo and/or redo history for an editable file being edited within the GUI 200. A pop-up menu may be displayed for the user on the display 104 in response to the detection. The pop-up menu may include selectable items, such as "Show Change History," or any other suitable options. It is additionally noted that the editable file may already be displayed at the time of the request to display the viewable selectable change history described herein. As such, the GUI 200 may be displayed over a current image of the editable file or the GUI 200 may replace the current image of the editable file on the display 104, as suitable for a given implementation. The current image of the editable file may also be displayed in a transparent manner within the background of the GUI 200. As such, while the editable file may be displayed within the background of the GUI 200, it is not shown within the GUI 200 for ease of illustration purposes.

The GUI 200 includes a contextual representation 202 of the editable file. An undo history 204 and a redo history 206 are also illustrated. For purposes of the present description, the undo history 204 and the redo history 206 are referred to as visual change stacks. The contextual representation 202 is illustrated as a vertical collection of pages 208, 210, 212, and 214 of the editable file. A compressed collection of additional pages 216, 218, and 220 is also shown to illustrate for the user that more pages form the editable file than are expanded within the contextual representation 202. It is noted that any other suitable form of contextually representing an editable file may be used for a given implementation.

The undo history 204 includes changes to the editable file that may be undone or reversed. The changes within the undo history may be independent changes to distinct elements of the editable file or may be logically related, such as a sequence of changes to an editable element of the editable file or a sequence of changes to the editable file during a configurable time period. Within the example GUI 200, a logically-related sequence of changes is represented by an edited change 222, an edited change 224, and an edited change 226. The undo history 204 also includes a compressed section 228 to illustrate for the user that more changes are tracked than are expanded within the logical sequence of changes described above. Details of this compressed section 228 will be described in more detail below. However, it is initially noted that the compressed section 228 may include additional sets of logically-related changes and additional changes to distinct elements of the editable file.

As can be seen from FIG. 2, the logical sequence of changes represented by the edited changes 222 through 226 results in the word "ACT." However, it is noted that the edited change 224 includes a typographical error, where the user accidentally struck the "X" key of a keyboard that was detected by the input device 106 after striking the "C" key.

The redo history 206 includes a collection of changes that have been undone in response to a request from the user via the input device 106. An undone edited change 230, and undone edited change 232, and an undone edited change 234 are shown. While the "X" character in the undone edited change 230 includes strike through formatting to represent that this undone change removed the letter "X" from the respective sequence of edits to the editable file, any suitable formatting may be used.

While the redo history 206 is not illustrated with a compressed section similar to the contextual representation 202 and the undo history 204, it is understood that the redo history 206 may also be represented with a similar compressed section should the redo history include sufficient elements to make such a compressed section suitable for a given sequence of editing changes.

As can also be seen from FIG. 2, the most recent edit in the logically-related sequence of changes represented by the edited changes 222 through 226 is shown to be in "focus" and in a forefront of the undo history 204 with a cursor 236 shown hovered over the edited change 226. Similarly to the focus associated with the undo history 204, the undone edited change 230 is shown to be in focus and in a forefront of the redo history 206. As such, focus of an element in the visual change stack associated with either the undo history 204 or the redo history 206 may result in focusing of related elements within the other of the two visual change stacks.

As the user moves the mouse and these movements are detected by the input device 106, different elements within the undo history 204 and the redo history 206 may be brought into focus within the GUI 200. For example, when either the undo history 204 or the redo history 206 are displayed, the respective visual change stack may be scrolled up or down in response to detected user inputs associated with "up" and "down" arrow key presses, respectively, on a keyboard. Additionally, elements may be moved between the respective undo history 204 and the redo history 206 in response to detected user inputs associated with "left" and "right" arrow key presses on the keyboard. Further, focus (e.g., for subsequent scrolling and other manipulations) may be moved between the undo history 204 and the redo history 206 in response to detection of "left" or "right" arrow key presses in combination with detection of another key press, such as detection of such a key press in combination with an "ALT" key press on the keyboard. Many other variations of navigation possibilities exist and all are considered within the scope of the present subject matter.

A contextual indicator 238 associated with the contextual representation 202 within the representation of the page 210 of the editable file provides an indication for the user of where the focused changes and focused undone changes within the undo history 204 and the redo history 206, respectively, are contextually located within the editable file. As such, the contextual representation 202 in combination with the contextual indicator 238 provides feedback for the user to assist the user with determinations regarding requests input to the computing device 100 to undo or redo changes from the undo history 204 and the redo history 206, respectively. As illustrated by the GUI 200, large and complex editing and review of changes to files is facilitated within a single display view, allowing for improved tracking and efficiency of changes.

Figure 3:
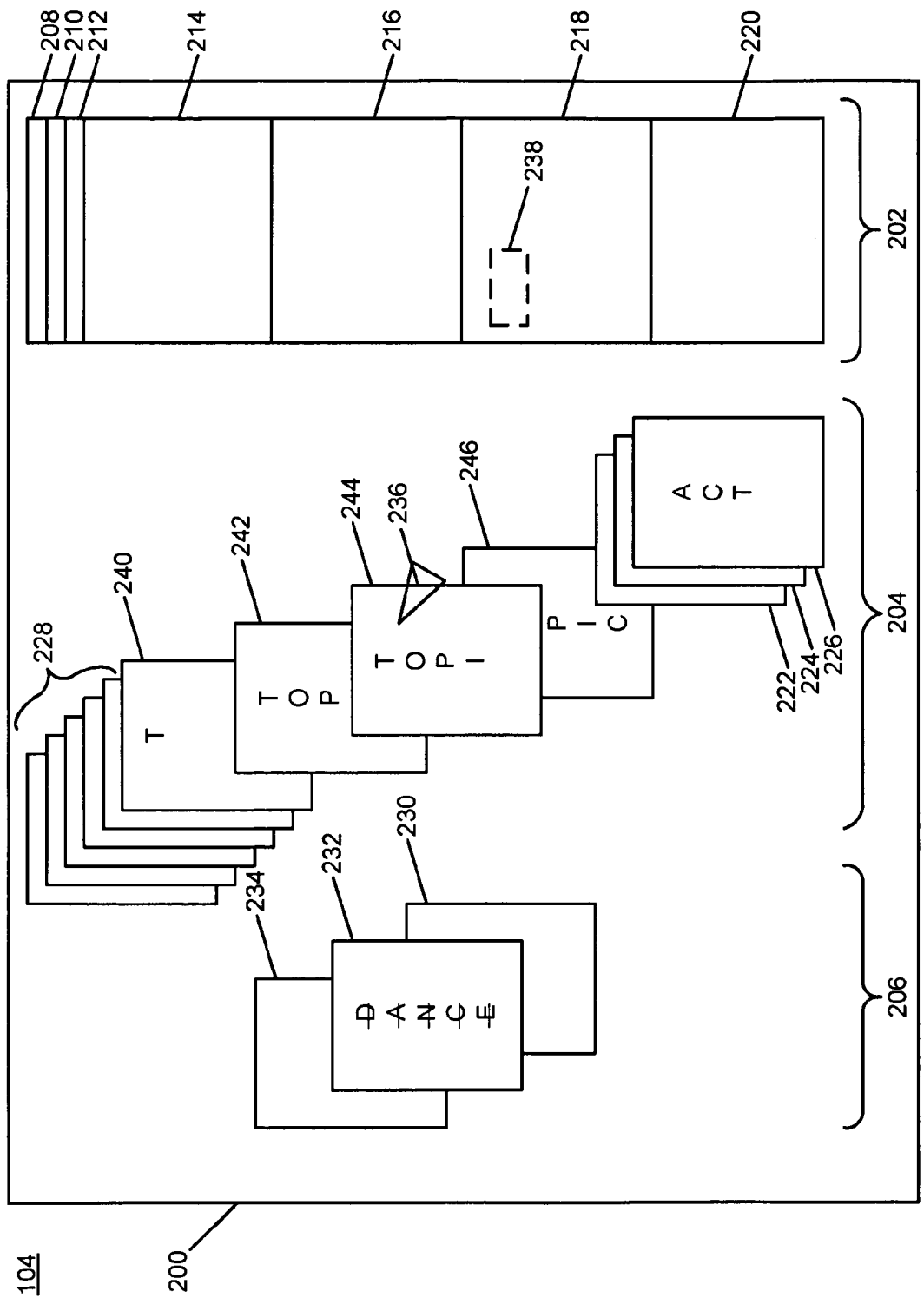
FIG. 3 is an illustration of an example of an implementation of the GUI of FIG. 2 that represents a state of operations for the GUI after detecting a user request to change a display location of a cursor and highlighting an edited change other than a most recent change in a logical sequence of changes within an undo history according to an embodiment of the present subject matter.

FIG. 3 is an illustration of an example of an implementation of the GUI 200 of FIG. 2 that represents a state of operations for the GUI 200 after detecting a user request to change a display location of the cursor 236 and highlighting an edited change other than a most recent change in a logical sequence of changes within the undo history 204. It is noted that the highlighting of the different edited change may be performed in response to detecting a sequence of "up" arrow key press detections relative to the previously focused edited change 226 of FIG. 2.

As can be seen from FIG. 3, the compressed section 228 includes fewer edited changes than shown in FIG. 2. A second logically-related sequence of changes is represented by an edited change 240, an edited change 242, an edited change 244, and an edited change 246. The second logically-related sequence of changes represented by the edited change 240 through the edited change 246 is automatically expanded within the visual change stack of the undo history 204.

Within FIG. 3, the cursor 236 is presently shown hovered over the edited change 244. As such, the edited change 244 is considered to be in focus within the GUI 200. Additionally, because the edited change 244 represents a portion of the logically-related sequence of changes, the text represented within the edited change 244 represents a portion of a word. As will be seen below in association with FIG. 4, the logical sequence of changes represented by the edited changes 240 through 246 results in the word "TOPIC" being added to the editable file.

As can also be seen from FIG. 3, the undone edited change 232 is now in focus and the undone edited change 230 is no longer in focus. This automated focusing of the undone edited change 232 provides the user with feedback to indicate that the undone edited change 232 is associated with the logically-related sequence of changes represented by the edited change 240 through the edited change 246. The undone edited change 232 shows that the user previously requested via the input device 106 for the word "DANCE" to be deleted and replaced with the word "TOPIC" through a logically-related sequence of edits. It is noted that the processing performed by the computing device 100 includes automated detection and categorization of logically-related sequences of edits to an editable file. As described above, a logically-related sequence of edits may be based upon a configured time frame, edits to an element of an editable file, or any other suitable logical relation.

A similar logically-related sequence of edits associated with either entry or deletion of the word "DANCE" may be tracked in a similar fashion to the edits associated with the word "TOPIC." As such, the redo history 206 may alternatively include a sequence of change elements similar to those shown within the undo history 204. However, because the edits for the word "DANCE" have been automatically determined to be logically related, they may be automatically gathered and condensed into one logical change element by the computing device 100 to conserve display space associated with the GUI 200 and to expedite viewable selectable change history manipulation.

As can also be seen from FIG. 3, the contextual representation 202 of the editable file has also been automatically modified in response to detecting the user manipulation of the mouse and/or key presses via the input device 106. As such, the collection of pages 208, 210, 212 are now shown as a compressed collection of pages. Additionally, the page 214 through the page 220 are shown expanded within the contextual representation 202.

The contextual indicator 238 associated with the contextual representation 202 is now shown within the representation of the page 218 of the editable file to provide an indication and feedback for the user of where the focused changes and focused undone changes within the undo history 204 and the redo history 206, respectively, are contextually located within the editable file. As such, the contextual representation 202, in combination with the contextual indicator 238, provides additional feedback for the user to assist the user with determinations regarding requests of the computing device 100 to undo or redo changes from the undo history 204 and the redo history 206, respectively.

Figure 4:
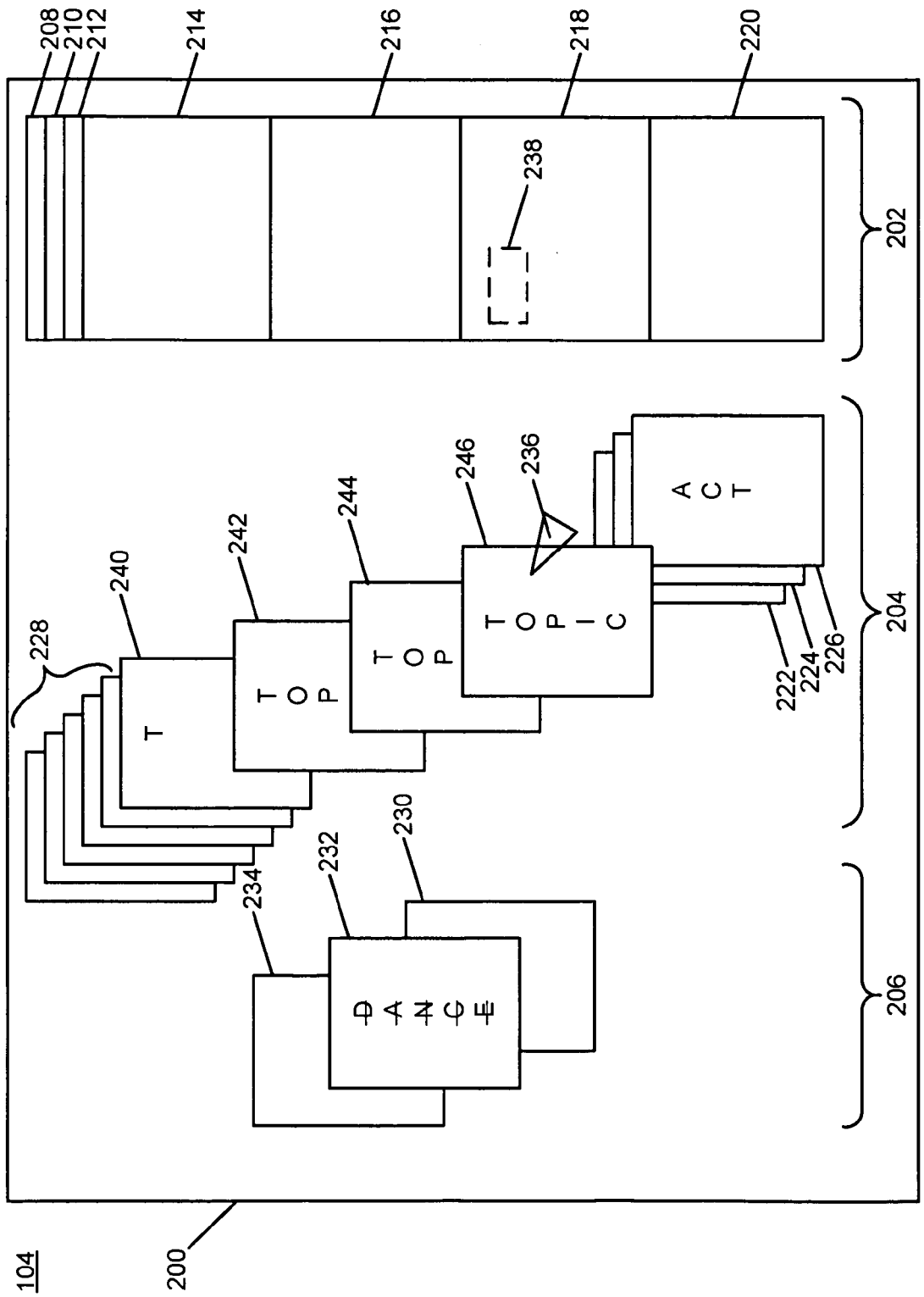
FIG. 4 is an illustration of an example of an implementation of the GUI of FIG. 3 that represents a state of operations for the GUI after detecting a user request to place the cursor over the edited change associated with the represented logical sequence of changes within the undo history according to an embodiment of the present subject matter.

FIG. 4 is an illustration of an example of an implementation of the GUI 200 of FIG. 3 that represents a state of operations for the GUI 200 after detecting a user request to place the cursor 236 over the edited change 246 associated with the represented logical sequence of changes within the undo history 204. In response to detecting this mouse (or arrow key) movement, the computing device 100 highlights the edited change 246 and brings it into focus and the forefront of the visual change stack of the undo history 204. It is noted that the highlighting of the final edited change may be performed in response to detection of a "down" arrow key press relative to the previously focused edited change 244 of FIG. 3. As can be seen from FIG. 4, the cursor 236 is presently hovered over the edited change 246. As such, the edited change 246 is considered to be in focus within the GUI 200. Additionally, because the edited change 246 represents a most recent of the logically-related sequence of changes, the text represented within the edited change 246 represents the entire word "TOPIC."

For purposes of the present example, it is assumed that the user wishes to undo the addition of the word "TOPIC" from the editable file and undo the removal of the word "DANCE" (e.g., redo the edit) to the editable file. As such, in response to detecting either a left mouse button press in combination with a mouse movement to the left or a "left" arrow key press, the requested changes may be performed to the editable file.

Figure 5:
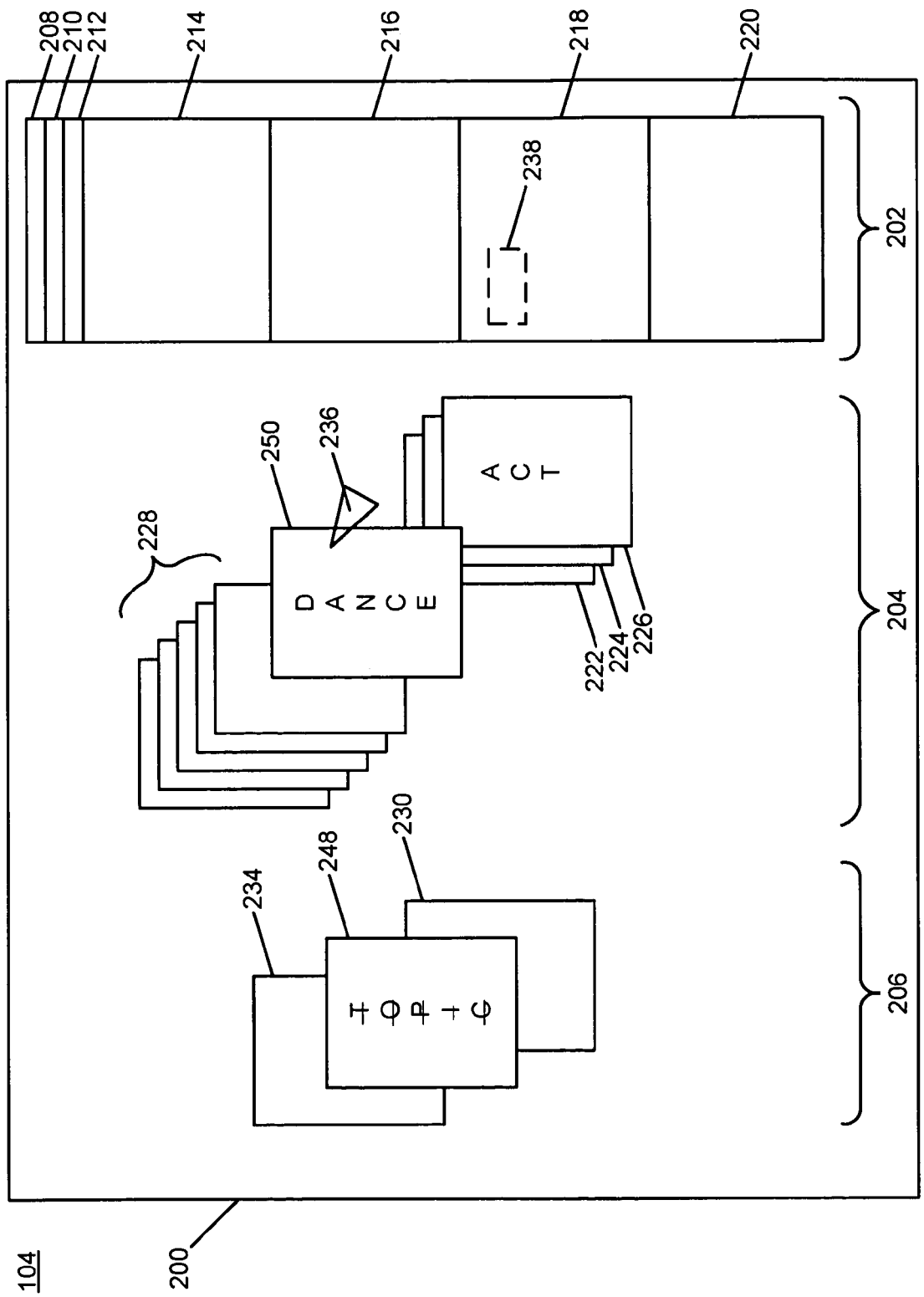
FIG. 5 is an illustration of an example of an implementation of a GUI that represents a state of operations for the GUI after processing has been completed to redo the logical sequence of changes represented by the edited change within the redo history according to an embodiment of the present subject matter.

FIG. 5 is an illustration of an example of an implementation of the GUI 200 of FIG. 4 that represents a state of operations for the GUI 200 after processing has been completed to redo the logical sequence of changes represented by the edited change 232 within the redo history 206. As can be seen from FIG. 5, the logically-related sequence of edited changes represented by the edited change 240 through the edited change 246 of FIG. 4 have been automatically condensed and moved to the redo history 206 as one condensed edited change 248. Additionally, the edited change 232 has been automatically moved from the redo history 206 to the undo history 204 and preserved as a condensed edited change 250. The cursor 236 is hovered over the edited change 250. As such, the edited change 250 and the edited change 248 are focused within the GUI 200 as logically-related elements between the undo history 204 and the redo history 206, respectively. Additionally, because the edited change 250 represents previously-deleted text that has been reinserted into the editable file represented by the contextual representation 202, the edited change 250 represents the entire word "DANCE." Similarly, the edited change 248 represents the entire deleted text "TOPIC."

FIG. 6 through FIG. 8B below describe example processes that may be executed by devices, such as the computing device 100, to perform the automated viewable selectable change history manipulation associated with the present subject matter. Many other variations on the example processes are possible and all are considered within the scope of the present subject matter. The example processes may be performed by modules, such as the change history processing module 118 and/or executed by the CPU 102, associated with such devices. It should be noted that time out procedures and other error control procedures are not illustrated within the example processes described below for ease of illustration purposes. However, it is understood that all such procedures are considered to be within the scope of the present subject matter.

Figure 6:
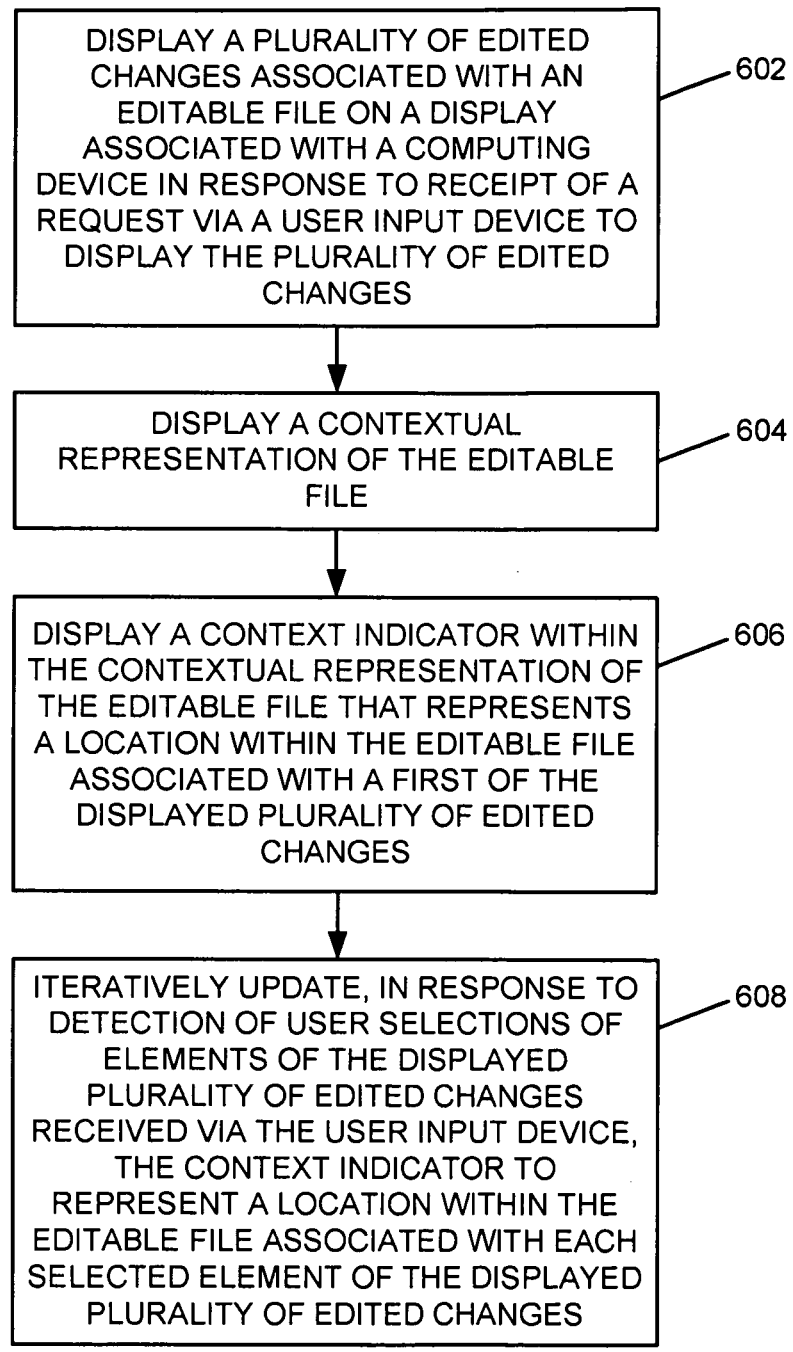
FIG. 6 is a flow chart of an example of an implementation of a process for automated viewable selectable change history manipulation according to an embodiment of the present subject matter.

FIG. 6 is a flow chart of an example of an implementation of a process 600 for automated viewable selectable change history manipulation. At block 602, the process 600 displays a plurality of edited changes associated with an editable file on a display associated with a computing device in response to receipt of a request via a user input device to display the plurality of edited changes. At block 604, the process 600 displays a contextual representation of the editable file. At block 606, the process 600 displays a context indicator within the contextual representation of the editable file that represents a location within the editable file associated with a first of the displayed plurality of edited changes. At block 608, the process 600 iteratively updates, in response to user selections of elements of the displayed plurality of edited changes received via the user input device, the context indicator to represent a location within the editable file associated with each selected element of the displayed plurality of edited changes.

Figure 7:
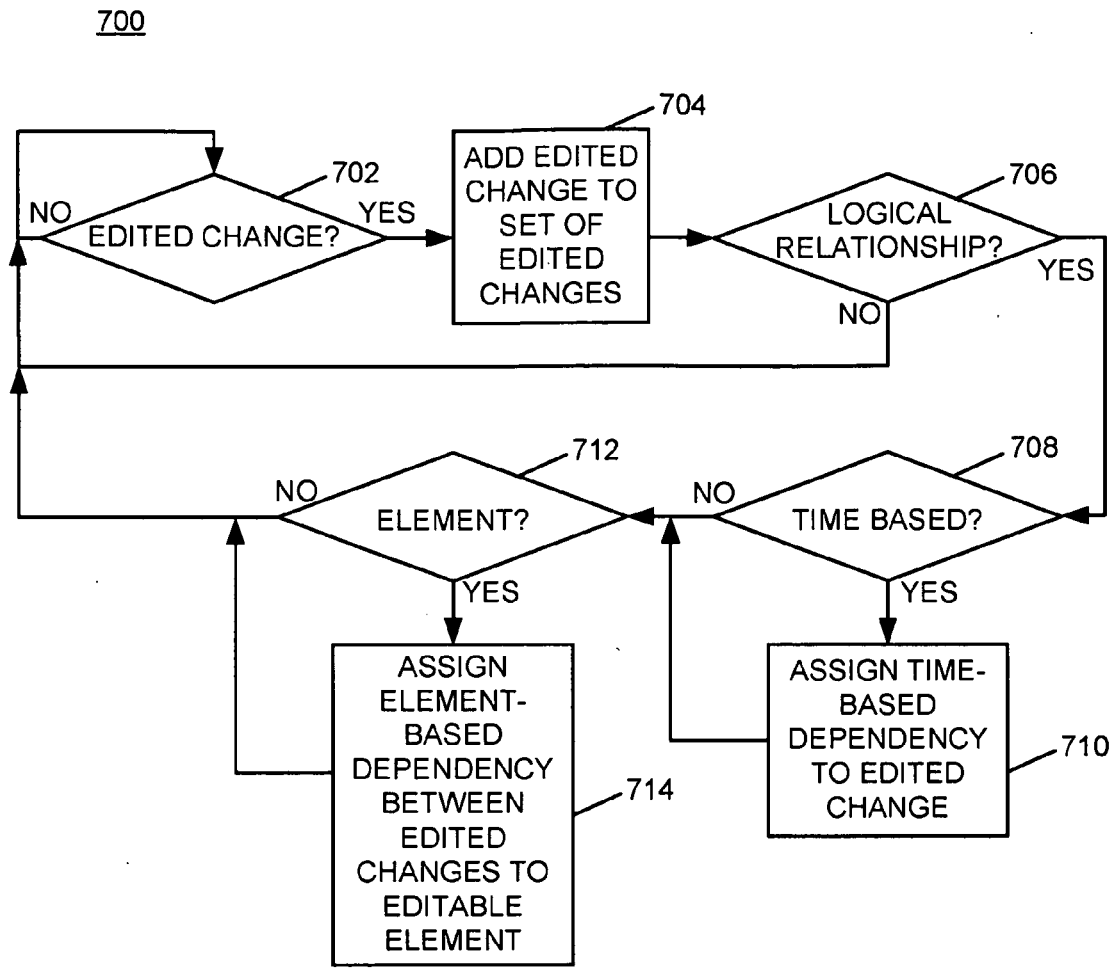
FIG. 7 is a flow chart of an example of an implementation of a process for automated building of a viewable selectable change history in response to changes to an editable file according to an embodiment of the present subject matter.

FIG. 7 is a flow chart of an example of an implementation of a process 700 for automated building of a viewable selectable change history in response to changes to an editable file. At decision point 702, the process 700 waits for an edited change to be detected via the input device 106. When a determination is made that an edited change has been detected, the process 700 adds the detected edited change to a set of edited changes at block 704. At decision point 706, the process 700 makes a determination as to whether the detected edited change shares a logical relationship with a sequence of changes to the editable file. For example, a determination of a logical relationship among a sequence of changes to the editable file may be based upon a sequence of changes over a configurable time period (e.g., a day, week, etc.), a sequence of changes to an editable element of the editable file, or any other suitable relationship.

When a determination is made that the detected edited change does not have a logical relationship with a sequence of changes to the editable file, the process 700 returns to decision point 702 to await detection of another edited change. When a determination is made that the detected edited change does have a logical relationship with a sequence of changes to the editable file, the process 700 makes a determination as to whether the detected edited change has a time-based relationship with the sequence of changes at decision point 708. At block 710, the process 700 assigns a time-based dependency to the detected edited change to create a logical relationship to the sequence of changes.

When a determination is made that the detected edited change does not have a time-based relationship with the sequence of changes or upon assigning the time-based dependency, the process 700 makes a determination as to whether the detected edited change has a relationship with an editable element associated with the sequence of changes to the editable file at decision point 712. When a determination is made that the detected edited change has a relationship with the editable element, the process 700 assigns an element-based dependency between the edited changes to the editable element associated with the sequence of changes to the editable file at block 714. When a determination is made that the detected edited change does not have a relationship with an editable element associated with the sequence of changes to the editable file or upon assigning the element-based dependency between the edited changes, the process 700 returns to decision point 702 to await detection of another edited change.

As such, the example process 700 provides for determining a logical relationship between a sequence of changes to the editable file, assigning the logical relationship to the sequence of changes, and maintaining the sequence of changes with the assigned logical relationship as one logical element of a set of edited changes. As will be described in more detail below, the selected sets of edited changes may further be based upon associated logical elements and reverted (e.g., undone or redone) as one action associated with the sequence of changes with the assigned logical relationship.

Figure 8A:
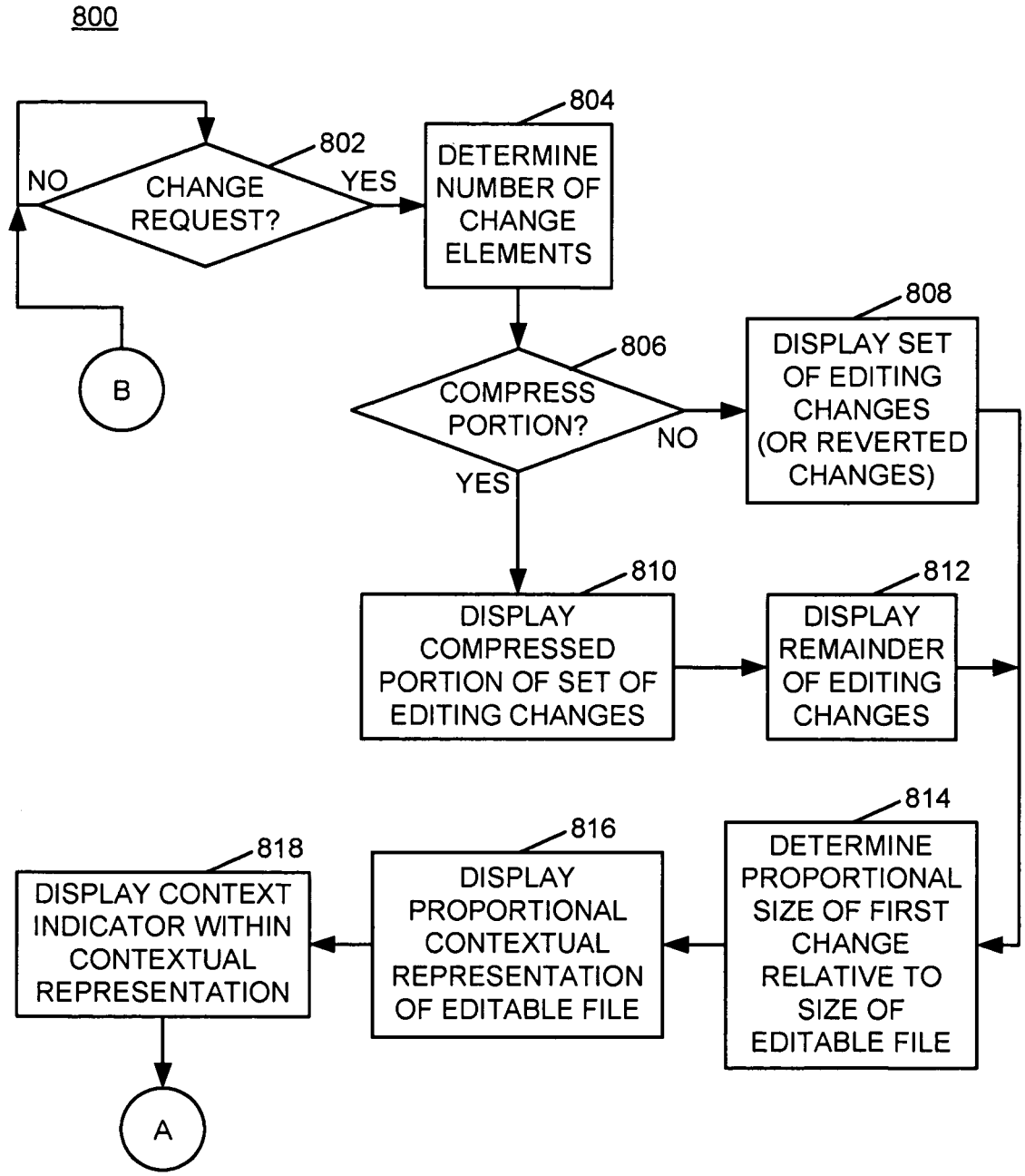
FIG. 8A is a flow chart of an example of an implementation of initial processing within a process for automated viewable selectable change history manipulation for either an undo history or a redo history according to an embodiment of the present subject matter.
Figure 8B:
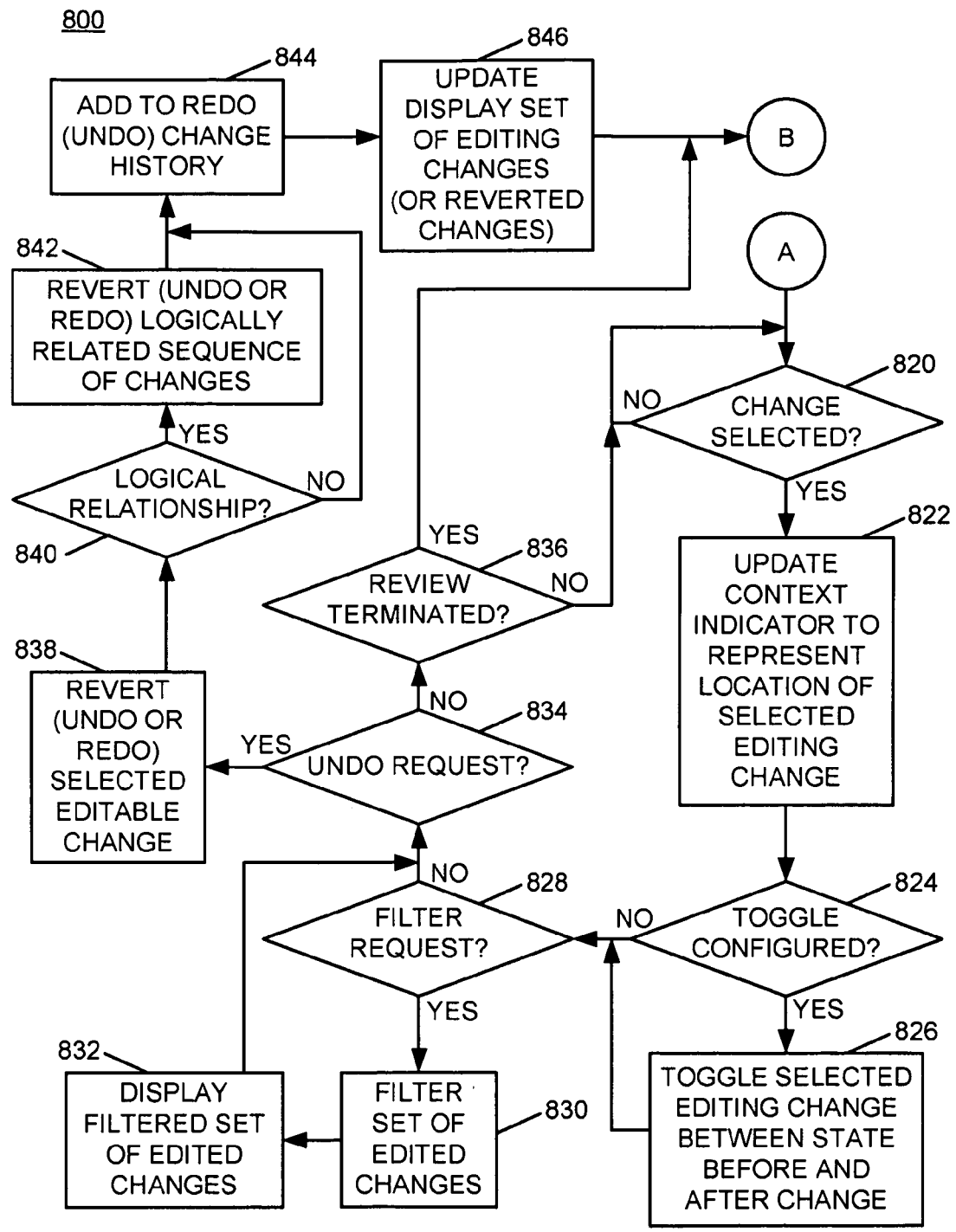
FIG. 8B is a flow chart of an example of an implementation of additional processing within a process for automated viewable selectable change history manipulation for either an undo history or a redo history according to an embodiment of the present subject matter.

FIG. 8A and FIG. 8B illustrate a flow chart of an example of an implementation of a process 800 for automated viewable selectable change history manipulation for either an undo history or a redo history. It should be understood that the process 800 applies to either undo operations or redo operations for edited changes. FIG. 8A illustrates initial processing within the process 800. At decision point 802, the process 800 waits for a change (e.g., edit) request to be detected, such as via the input device 106. As described above, the user may request display of a viewable selected change history for manipulation that includes a set of edited changes by selecting a key sequence associated with a keyboard or by selecting a menu item from a pop-up menu displayed on the display 104. When a determination is made that a change request has been detected, the process 800 determines a number of change elements associated with the editable file at block 804. At decision point 806, the process 800 determines whether the set of edited changes associated with the editable file include more elements than displayable on the display 104 within a visual change stack. This determination may be based upon viewable area of the display 104 and upon whether a redo history (or conversely an undo history) includes any elements to be displayed.

When a determination is made that the set of edited changes associated with the editable file does not include more elements than are displayable on the display 104 within the visual change stack, the process 800 displays the set of edited changes associated with an editable file on the display 104 as a visual change stack at block 808. The process 800 also displays any redo history within a separate visual change stack at block 808.

When a determination is made that the set of edited changes associated with the editable file includes more elements than are displayable on the display 104 within the visual change stack, the process 800 displays a portion of the elements of the set of edited changes as a compressed portion of the visual change stack at block 810. The portion compressed may also be configurable and any configured number for compressed display associated with a visual change stack may be considered.

At block 812, the process 800 displays a remainder of the elements of the respective change history (e.g., the undo change history or the redo change history) as an uncompressed portion of the visual change stack. Upon displaying the set of edited changes associated with an editable file at block 808 or upon displaying the remainder of the elements of the respective change history at block 812, the process 800 determines a proportion of a size of edited change relative to a size of the editable file at block 814. At block 816, the process 800 displays a proportional contextual representation of the editable file proximate to the displayed set of edited changes (e.g., the visual change stack) based upon the determined proportion. At block 818, the process 800 displays a context indicator within the contextual representation of the editable file that represents a location within the editable file associated with the first of the displayed set of edited changes. The context indicator may include highlighting, such as a dashed box or a colored/shaded highlighting associated with the location within the editable file associated with the first of the displayed set of edited changes. The process 800 transitions to the processing shown and described in association with FIG. 8B.

FIG. 8B illustrates additional processing associated with the process 800 for automated viewable selectable change history manipulation for either an undo history or a redo history. At decision point 820, the process 800 waits for an edited change element within the visual change history of the respective change history to be selected. As describe above, the visual change stack may be scrolled up or down in response to detected user inputs associated with "up" and "down" arrow key presses, respectively, on a keyboard. This scrolling from item to item within a given visual change stack may constitute a selection of each edited change element that may be detected for purposes of the present subject matter. Alternatively, the user may move a mouse. In response to detection of the movement, a determination may be made of a new location for a cursor to be displayed and that the display location is associated with a display location of a particular edited change element. Detection of such a mouse movement and the determination of the new location for the cursor in association with the particular edited change element may also constitute a selection of the particular edited change element. Other alternatives exist for detecting selection of an edited change element and all are considered within the scope of the present subject matter.

When a determination is made at decision point 820 that an edited change within the visual change history has been selected, the process 800 updates the displayed context indicator within the contextual representation of the editable file to represent a location of the selected edited change at block 822. As described above, this processing may include compressing or uncompressing portions of the contextual representation of the editable file.

At decision point 824, the process 800 makes a determination as to whether toggling is configured for either the visual change stack or for the contextual representation of the editable file. When a determination is made that toggling is configured for either the visual change stack or for the contextual representation of the editable file, the process 800 toggles a displayed portion of the editable file associated with the selected edited change within either the visual change stack or the contextual representation of the editable file between a state prior to the selected edited change and a state after the selected edited changes at block 826.

When a determination is made at decision point 824 that toggling is not configured for either the visual change stack or the contextual representation of the editable file or upon initiating toggling of the content within either the visual change stack or the contextual representation at block 826, the process 800 makes a determination at decision point 828 as to whether a filter request has been received via the input device 106 to filter a selected visual change stack based upon the selected edited change. When a determination is made that a filter request has been received, the process 800 filters the set of edited changes at block 830 and displays the filtered set of edited changes at block 832.

Upon completion of filtering and displaying the filtered edited changes or upon determining that a filter request has not been received, the process 800 makes a determination at decision point 834 as to whether an undo request (or a redo request, as appropriate) has been received. When a determination is made that an undo request has not been received, the process 800 makes a determination as to whether review of the respective visual change stack has been terminated at decision point 836. When a determination is made that review of the respective visual change stack has not been terminated, the process 800 returns to decision point 820 to continue processing as described above. Description of processing performed when review of the respective visual change stack has been terminated will be presented below after additional description of processing associated with decision point 834.

Returning to the description of decision point 834, when a determination is made that an undo request has been received, the process 800 reverts the selected edited change (e.g., undoes or re-performs) at block 838. At decision point 840, the process 800 makes a determination as to whether a logical relationship among a sequence of changes to the editable file is associated with the selected edited change. When a determination is made that a logical relationship among a sequence of changes to the editable file is associated with the selected edited change, the process 800 reverts (e.g., undoes or re-performs) the logically-related sequence of changes at block 842. At block 844, the process 800 adds the selected edited changes, including any edited changes that are logically-related to the selected edited change, to the redo history (when the process 800 is operating upon an item selected from the undo history). The process 800 alternatively adds the selected edited changes, including any edited changes that are logically-related to the selected edited change, to the undo history (when the process 800 is operating upon an item selected from the redo history). As described above, the undo history and the redo history may be maintained within a database, such as the undo history storage area 122 or the redo history storage area 124 of the database 120, respectively, or within the memory 112, as appropriate for the given implementation. At block 846, the process 800 updates the displayed visual redo history change stack and the undo history change stack to reflect the processed changes.

Upon completion of updating the displayed visual redo history change stack and the undo history change stack, or upon determining that the review has been terminated at decision point 836, the process 800 returns to processing described in association with FIG. 8A. The process 800 then returns to decision point 802 to await another change request.

As such, the example process 800 provides automated viewable selectable change history manipulation for and between either an undo history or a redo history. Portions of visual change stacks are automatically compressed based upon available display area, and a proportional contextual representation is displayed to automatically updated to provide feedback and context for an area of an editable file associated with a selected change on the visual change stack. Toggling of selected edited changes and filtering of the visual change stacks is also provided, along with movement of selected edited changes, including any edited changes that are logically-related to selected edited changes between an undo history and a redo history.

As described above in association with FIG. 1 through FIG. 8B, the example systems and processes provide automated viewable selectable change history manipulation. Many other variations and additional activities associated with viewable selectable change history manipulation are possible and all are considered within the scope of the present subject matter.

Those skilled in the art will recognize, upon consideration of the above teachings, that certain of the above examples are based upon use of a programmed processor, such as the CPU 102. However, the invention is not limited to such example embodiments, since other embodiments could be implemented using hardware component equivalents such as special purpose hardware and/or dedicated processors. Similarly, general purpose computers, microprocessor based computers, micro-controllers, optical computers, analog computers, dedicated processors, application specific circuits and/or dedicated hard wired logic may be used to construct alternative equivalent embodiments.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method, comprising:
    displaying a plurality of edited changes associated with an editable file on a display associated with a computing device in response to receipt of a request via a user input device to display the plurality of edited changes;
    displaying, proximate to the displayed plurality of edited changes, a separate contextual representation of the editable file that comprises a contiguous series of individually expandable and compressible blank representations of pages of the editable file, where each subsequent blank page representation in the contiguous series shares one common border with a respective previous blank page representation in the contiguous series;
    displaying a context indicator within an expanded blank page representation of the separate contextual representation of the editable file that represents a location within the editable file associated with a first of the displayed plurality of edited changes; and
    iteratively updating, in response to detection of user selections of elements of the displayed plurality of edited changes received via the user input device, the context indicator within iteratively expanded blank page representations of the separate contextual representation of the editable file to represent a location within the editable file associated with each selected element of the displayed plurality of edited changes.

2. The method of claim 1, further comprising:
receiving a request to undo a selected one of the displayed plurality of edited changes associated with the editable file; and
reverting the selected one of the plurality of edited changes associated with the editable file.

3. The method of claim 2, further comprising:
determining a logical relationship between a sequence of changes to the editable file;
maintaining the sequence of changes with the determined logical relationship as one logical element of the plurality of edited changes; and
where, the selected one of the plurality of edited changes comprises the one logical element and reverting the selected one of the plurality of edited changes associated with the editable file comprises reverting the sequence of changes with the determined logical relationship.

4. The method of claim 3, where determining the logical relationship between the sequence of changes to the editable file comprises at least one of:
determining a dependency between two changes of the sequence of changes to an editable element of the editable file; and
determining that the sequence of changes occurred during a configurable time period.

5. The method of claim 1, where displaying the plurality of edited changes associated with the editable file on the display associated with the computing device in response to receipt of the request via the user input device to display the plurality of edited changes comprises:
displaying the plurality of edited changes as a visual change stack on the display associated with the computing device;
determining whether the plurality of edited changes comprises more elements than displayable on the display within the visual change stack; and
displaying, in response to a determination that the plurality of edited changes comprises more elements than displayable on the display within the visual change stack, a portion of the elements of the plurality of edited changes as a compressed portion of the visual change stack.

6. The method of claim 1, where:
displaying, proximate to the displayed plurality of edited changes, the separate contextual representation of the editable file that comprises the contiguous series of individually expandable and compressible blank representations of pages of the editable file comprises:
determining a proportion of a size of a selected one of the plurality of edited changes relative to a size of the editable file; and
displaying an expanded blank page representation of a separate proportional contextual representation of the editable file proximate to the displayed plurality of edited changes based upon the determined proportion; and
displaying the context indicator within the expanded blank page representation of the separate contextual representation of the editable file that represents the location within the editable file associated with the first of the displayed plurality of edited changes comprises:
highlighting a region of the expanded blank page representation of the separate proportional contextual representation of the editable file associated with the selected one of the plurality of edited changes.

7. The method of claim 1, further comprising:
maintaining, within a memory of the computing device, a redo history comprising a plurality of reverted editing changes associated with the editable file;
adding a selected one of the plurality of edited changes to the redo history;
displaying the plurality of reverted editing changes;
receiving a request to redo the selected one of the plurality of edited changes from the user via the user input device; and
performing, in response to the request to redo the selected one of the plurality of edited changes from the user via the user input device, the selected one of the plurality of edited changes for the editable file.

8. The method of claim 1, further comprising:
receiving a request to filter the plurality of edited changes based upon a selected one of the plurality of edited changes;
filtering the plurality of edited changes based upon the selected one of the plurality of edited changes; and
where displaying the plurality of edited changes associated with the editable file on the display associated with the computing device comprises displaying the filtered plurality of edited changes.

9. The method of claim 1, where displaying the context indicator within the expanded blank page representation of the separate contextual representation of the editable file that represents the location within the editable file associated with the first of the displayed plurality of edited changes comprises:
toggling a displayed portion of the editable file associated with the first of the displayed plurality of edited changes within the expanded blank page representation of the separate contextual representation of the editable file between a state prior to a selected one of the plurality of edited changes and a state after the selected one of the plurality of edited changes.

10. A system, comprising:
a display;
a user input device; and
a processor programmed to:
display a plurality of edited changes associated with an editable file on the display in response to receipt of a request via the user input device to display the plurality of edited changes;
display, proximate to the displayed plurality of edited changes, a separate contextual representation of the editable file that comprises a contiguous series of individually expandable and compressible blank representations of pages of the editable file, where each subsequent blank page representation in the contiguous series shares one common border with a respective previous blank page representation in the contiguous series;
display a context indicator within an expanded blank page representation of the separate contextual representation of the editable file that represents a location within the editable file associated with a first of the displayed plurality of edited changes; and
iteratively update, in response to detection of user selections of elements of the displayed plurality of edited changes received via the user input device, the context indicator within iteratively expanded blank page representations of the separate contextual representation of the editable file to represent a location within the editable file associated with each selected element of the displayed plurality of edited changes.

11. The system of claim 10, where the processor is further programmed to:
receive a request to undo a selected one of the displayed plurality of edited changes associated with the editable file; and
revert the selected one of the plurality of edited changes associated with the editable file.

12. The system of claim 11, where the processor is further programmed to:
determine a logical relationship between a sequence of changes to the editable file;
maintain the sequence of changes with the determined logical relationship as one logical element of the plurality of edited changes; and
where, the selected one of the plurality of edited changes comprises the one logical element and, where in being programmed to revert the selected one of the plurality of edited changes associated with the editable file, the processor is programmed to revert the sequence of changes with the determined logical relationship.

13. The system of claim 12, where, in being programmed to determine the logical relationship between the sequence of changes to the editable file, the processor is programmed to at least one of:
determine a dependency between two changes of the sequence of changes to an editable element of the editable file; and
determine that the sequence of changes occurred during a configurable time period.

14. The system of claim 10, where, in being programmed to display the plurality of edited changes associated with the editable file on the display in response to receipt of the request via the user input device to display the plurality of edited changes, the processor is programmed to:
display the plurality of edited changes as a visual change stack on the display;
determine whether the plurality of edited changes comprises more elements than displayable on the display within the visual change stack; and
display, in response to a determination that the plurality of edited changes comprises more elements than displayable on the display within the visual change stack, a portion of the elements of the plurality of edited changes as a compressed portion of the visual change stack.

15. The system of claim 10, where the processor is further programmed to:
receive a request to filter the plurality of edited changes based upon a selected one of the plurality of edited changes;
filter the plurality of edited changes based upon the selected one of the plurality of edited changes; and
where, in being programmed to display the plurality of edited changes associated with the editable file on the display, the processor is further programmed to display the filtered plurality of edited changes.

16. A system, comprising:
a display;
a user input device; and
a processor programmed to:
display a plurality of edited changes associated with an editable file on the display in response to receipt of a request via the user input device to display the plurality of edited changes;
display, proximate to the displayed plurality of edited changes, a separate contextual representation of the editable file that comprises a contiguous series of individually expandable and compressible blank representations of pages of the editable file, where each subsequent blank page representation in the contiguous series shares one common border with a respective previous blank page representation in the contiguous series;
display a context indicator within an expanded blank page representation of the separate contextual representation of the editable file that represents a location within the editable file associated with a first of the displayed plurality of edited changes;
iteratively update, in response to detection of user selections of elements of the displayed plurality of edited changes received via the user input device, the context indicator within iteratively expanded blank page representations of the separate contextual representation of the editable file to represent a location within the editable file associated with each selected element of the displayed plurality of edited changes;
determine a logical relationship between a sequence of changes to the editable file;
maintain the sequence of changes with the determined logical relationship as one logical element of the plurality of edited changes;
receive a request to undo the sequence of changes with the determined logical relationship maintained as the one logical element; and
revert the sequence of changes with the determined logical relationship.

17. A computer program product comprising a computer readable storage medium including a computer readable program, where the computer readable program when executed on a computer causes the computer to:
display a plurality of edited changes associated with an editable file on a display in response to receipt of a request via a user input device to display the plurality of edited changes;
display, proximate to the displayed plurality of edited changes, a separate contextual representation of the editable file that comprises a contiguous series of individually expandable and compressible blank representations of pages of the editable file, where each subsequent blank page representation in the contiguous series shares one common border with a respective previous blank page representation in the contiguous series;
display a context indicator within an expanded blank page representation of the separate contextual representation of the editable file that represents a location within the editable file associated with a first of the displayed plurality of edited changes; and
iteratively update, in response to detection of user selections of elements of the displayed plurality of edited changes received via the user input device, the context indicator within iteratively expanded blank page representations of the separate contextual representation of the editable file to represent a location within the editable file associated with each selected element of the displayed plurality of edited changes.

18. The computer program product of claim 17, where the computer readable program when executed on the computer further causes the computer to:
receive a request to undo a selected one of the displayed plurality of edited changes associated with the editable file; and
revert the selected one of the plurality of edited changes associated with the editable file.

19. The computer program product of claim 18, where the computer readable program when executed on the computer further causes the computer to:
- determine a logical relationship between a sequence of changes to the editable file;
- maintain the sequence of changes with the determined logical relationship as one logical element of the plurality of edited changes; and
- where, the selected one of the plurality of edited changes comprises the one logical element and, where in causing the computer to revert the selected one of the plurality of edited changes associated with the editable file, the computer readable program when executed on the computer causes the computer to revert the sequence of changes with the determined logical relationship.

20. The computer program product of claim 19, where, in causing the computer to determine the logical relationship between the sequence of changes to the editable file, the computer readable program when executed on the computer causes the computer to at least one of:
- determine a dependency between two changes of the sequence of changes to an editable element of the editable file; and
- determine that the sequence of changes occurred during a configurable time period.

21. The computer program product of claim 17, where, in causing the computer to display the plurality of edited changes associated with the editable file on the display in response to receipt of the request via the user input device to display the plurality of edited changes, the computer readable program when executed on the computer causes the computer to:
- display the plurality of edited changes as a visual change stack on the display;
- determine whether the plurality of edited changes comprises more elements than displayable on the display within the visual change stack; and
- display, in response to a determination that the plurality of edited changes comprises more elements than displayable on the display within the visual change stack, a portion of the elements of the plurality of edited changes as a compressed portion of the visual change stack.

22. The computer program product of claim 17, where:
in causing the computer to display, proximate to the displayed plurality of edited changes, the separate contextual representation of the editable file that comprises the contiguous series of individually expandable and compressible blank representations of pages of the editable file, the computer readable program when executed on the computer causes the computer to:
- determine a proportion of a size of a selected one of the plurality of edited changes relative to a size of the editable file; and
- display an expanded blank page representation of a separate proportional contextual representation of the editable file proximate to the displayed plurality of edited changes based upon the determined proportion; and in causing the computer to display the context indicator within the expanded blank page representation of the separate contextual representation of the editable file that represents the location within the editable file associated with the first of the displayed plurality of edited changes, the computer readable program when executed on the computer causes the computer to:
- highlight a region of the expanded blank page representation of the separate proportional contextual representation of the editable file associated with the selected one of the plurality of edited changes.

23. The computer program product of claim 17, where the computer readable program when executed on the computer further causes the computer to:
- maintain, within a memory, a redo history comprising a plurality of reverted editing changes associated with the editable file;
- add a selected one of the plurality of edited changes to the redo history;
- display the plurality of reverted editing changes;
- receive a request to redo the selected one of the plurality of edited changes from the user via the user input device; and
- perform, in response to the request to redo the selected one of the plurality of edited changes from the user via the user input device, the selected one of the plurality of edited changes for the editable file.

24. The computer program product of claim 17, where the computer readable program when executed on the computer further causes the computer to:
- receive a request to filter the plurality of edited changes based upon a selected one of the plurality of edited changes;
- filter the plurality of edited changes based upon the selected one of the plurality of edited changes; and
- where, in causing the computer to display the plurality of edited changes associated with the editable file on the display, the computer readable program when executed on the computer causes the computer to display the filtered plurality of edited changes.

25. The computer program product of claim 17, where, in causing the computer to display the context indicator within the expanded blank page representation of the separate contextual representation of the editable file that represents the location within the editable file associated with the first of the displayed plurality of edited changes, the computer readable program when executed on the computer causes the computer to:
- toggle a displayed portion of the editable file associated with the first of the displayed plurality of edited changes within the expanded blank page representation of the separate contextual representation of the editable file between a state prior to a selected one of the plurality of edited changes and a state after the selected one of the plurality of edited changes.

* * * * *